US010927620B2

(12) United States Patent
Gatt

(10) Patent No.: US 10,927,620 B2
(45) Date of Patent: Feb. 23, 2021

(54) MAGNETIC SWARF DRUM

(71) Applicant: Halliburton Manufacturing and Services, Limited, London (GB)

(72) Inventor: Wayne Gatt, Aberdeenshire (GB)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/776,994

(22) PCT Filed: Dec. 29, 2017

(86) PCT No.: PCT/IB2017/058523
§ 371 (c)(1),
(2) Date: May 17, 2018

(87) PCT Pub. No.: WO2018/172843
PCT Pub. Date: Sep. 27, 2018

(65) Prior Publication Data

US 2020/0325740 A1 Oct. 15, 2020

(30) Foreign Application Priority Data

Mar. 20, 2017 (GB) ..................................... 1704360

(51) Int. Cl.
*E21B 21/06* (2006.01)
*B03C 1/033* (2006.01)
(Continued)

(52) U.S. Cl.
CPC .......... *E21B 21/065* (2013.01); *B03C 1/0332* (2013.01); *B03C 1/26* (2013.01);
(Continued)

(58) Field of Classification Search
None
See application file for complete search history.

(56) References Cited

U.S. PATENT DOCUMENTS 3,952,857 A * 4/1976 Nazuka .................. B65G 29/02
198/637
4,539,102 A * 9/1985 Boston ...................... B03C 1/10
166/66.4
(Continued)

FOREIGN PATENT DOCUMENTS

EA 12892 B1 12/2009
RU 2146551 C1 3/2000
(Continued)

OTHER PUBLICATIONS

International Search Report and Written Opinion for Application No. PCT/IB2017/058523 dated Apr. 5, 2018.
(Continued)

*Primary Examiner* — Shane Bomar
(74) *Attorney, Agent, or Firm* — Tenley Krueger; C. Tumey Law Group PLLC

(57) ABSTRACT

This disclosure may generally relate to drilling operations and, more particularly, to systems and methods for cleaning a drilling fluid as it travels back to the surface from a wellbore. An apparatus may comprise a magnetic body having a longitudinal axis. The magnetic body may comprise a pair of end plates that are spaced along the longitudinal axis and a magnetic unit disposed between the pair of end plates, wherein the magnetic unit is operable to generate a magnetic field. The apparatus may additionally comprise an axle disposed along a longitudinal axis of the magnetic body, wherein the axle is operable to rotate the magnetic body about the longitudinal axis.

19 Claims, 7 Drawing Sheets

(51) Int. Cl.

| | |
|---|---|
| ***B03C 1/26*** | (2006.01) |
| ***B03C 1/28*** | (2006.01) |
| ***B03C 1/30*** | (2006.01) |
| ***E21B 29/06*** | (2006.01) |

(52) U.S. Cl.

CPC ................ *B03C 1/286* (2013.01); *B03C 1/30* (2013.01); *E21B 29/06* (2013.01); *B03C 2201/18* (2013.01)

(56) References Cited

U.S. PATENT DOCUMENTS

| | | | | |
|---|---|---|---|---|
| 4,841,244 | A * | 6/1989 | Chambers .............. | G01N 27/72 324/204 |
| 5,944,195 | A | 8/1999 | Huang et al. | |
| 2011/0186523 | A1 | 8/2011 | Williamson et al. | |
| 2015/0159448 | A1* | 6/2015 | White ..................... | B03C 1/286 175/57 |
| 2015/0298139 | A1 | 10/2015 | Wilkes | |
| 2016/0151789 | A1* | 6/2016 | Van Schie ............... | C02F 1/481 210/695 |
| 2017/0211954 | A1* | 7/2017 | Dykstra ................. | G01D 18/00 |
| 2017/0335643 | A1* | 11/2017 | Allen ...................... | B03B 5/442 |
| 2019/0112883 | A1* | 4/2019 | McKenzie .............. | B03C 1/284 |
| 2020/0215549 | A1* | 7/2020 | Farquhar ................... | B03C 1/12 |

FOREIGN PATENT DOCUMENTS

| | | | |
|---|---|---|---|
| RU | 2159681 | C2 | 11/2000 |
| SU | 1488004 | A1 | 6/1989 |
| WO | 2015012696 | | 1/2015 |

OTHER PUBLICATIONS

Russian Search Report for Application No. 2019124974 dated Feb. 12, 2020.

Partial Translation for Russian Search Report for Application No. 2019124974 dated Feb. 20, 2020.

* cited by examiner

MAGNETIC SWARF DRUM

BACKGROUND

Wells may be drilled into subterranean formations to recover valuable hydrocarbons. Various operations may be performed before, during, and after the well has been drilled to produce and continue the flow of the hydrocarbon fluids to the surface.

Traditionally, drilling platforms use drilling fluids to lubricate drilling operations. These drilling fluids lubricate, cool, and transport debris away from the drill string. As the production of a well approaches the end of the well's life cycle, the well may be prepared to be capped or sealed. In older platforms, removal of the drill string may be difficult and/or uneconomic as a whole. It may be more suitable to drill out the drill string as part of a well-capping clean up exercise, depending on various factors. Given that drill strings include largely ferric metallic components, large amounts of debris may be disposed within the drilling fluid after the process. Often, it is desirable to recycle the used drilling fluids. However, the metallic debris within the drilling fluids may be harmful to drilling equipment.

BRIEF DESCRIPTION OF THE DRAWINGS

For a detailed description of the preferred embodiments of the invention, reference will now be made to the accompanying drawings in which.

DETAILED DESCRIPTION

This disclosure may generally relate to drilling operations and, more particularly, to systems and methods for cleaning a drilling fluid as it travels back to the surface from a wellbore. Those of ordinary skill in the art will readily recognize that the principles described herein are equally applicable to any other suitable fluid processing requiring the removal of metallic debris.

A system and method may be used to remove the metals from the drilling fluid once it has returned to the surface. A processing unit may be disposed on the surface, near the well head, to clean and filter out any magnetic swarf present in the drilling fluid. As described herein, the term "swarf" may refer to pieces of metal, wood, plastic, and/or combinations thereof that are the debris or waste resulting from a subtractive manufacturing process. At least some of the swarf may be ferromagnetic materials attracted to magnets.

Figure 1:
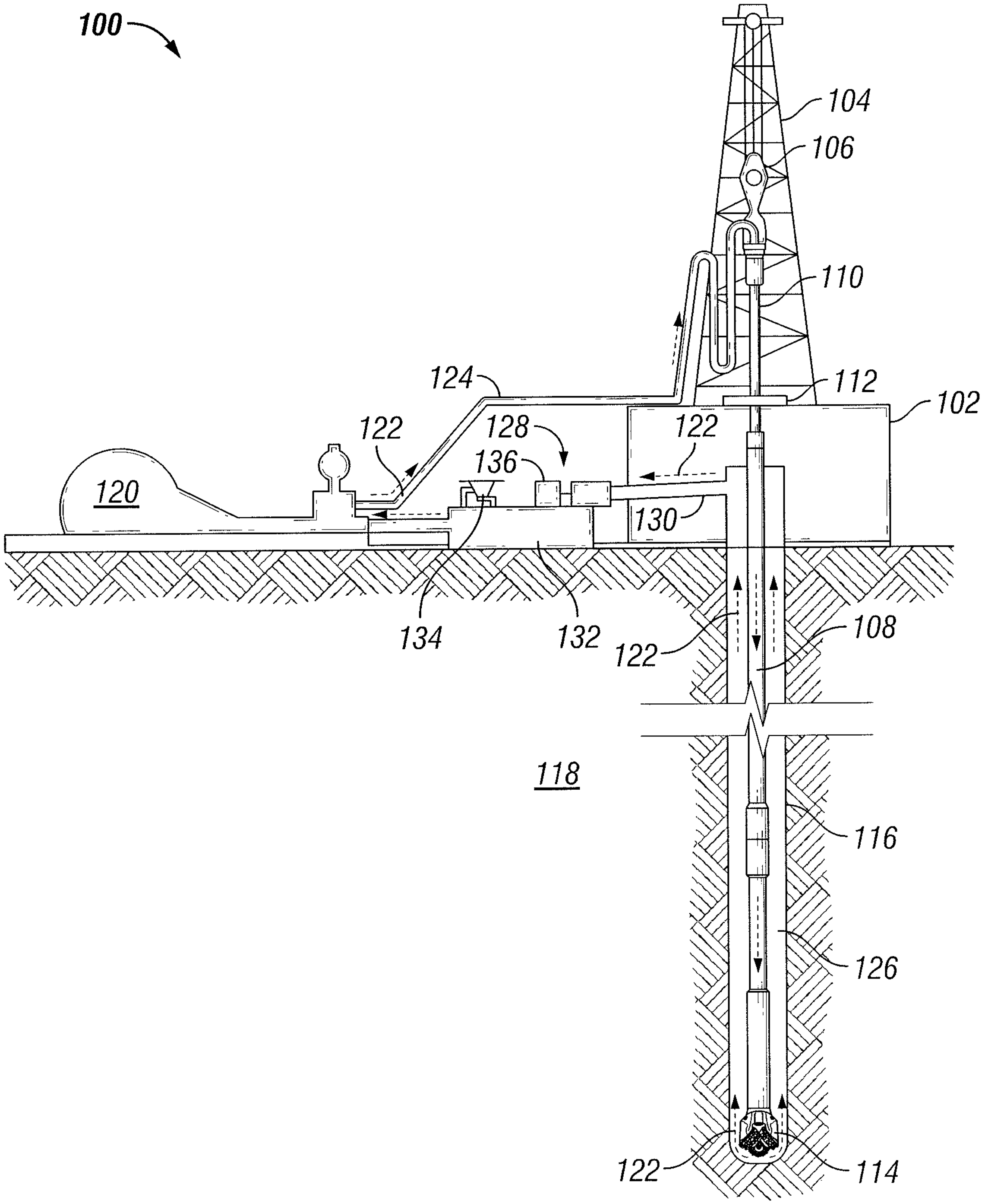
FIG. 1 illustrates a system for delivery of a drilling fluid to a wellbore.

FIG. 1 illustrates a system for delivery of a drilling fluid to a wellbore. With reference to FIG. 1, drilling fluids used in operation of a wellbore may directly or indirectly affect one or more components or pieces of equipment associated with a drilling assembly 100. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, conduits such as drill pipe and coiled tubing, as generally known to those skilled in the art. A kelly 110 may support the drill string 108 as it is lowered through a rotary table 112. A drill bit 114 is attached to the distal end of the drill string 108 and is driven either by a downhole motor and/or via rotation of the drill string 108 from the well surface. As the drill bit 114 rotates, it creates a wellbore 116 that penetrates various subterranean formations 118.

A pump 120 (e.g., a mud pump) circulates drilling fluid 122, which may have been stored in a vessel prior to use, through a feed pipe 124 and to the kelly 110, which conveys the drilling fluid 122 downhole through the interior of the drill string 108 and through one or more orifices in the drill bit 114. The pump 120 may be part of a pumping system. Drilling fluid 122 is then circulated back to the surface via an annulus 126 defined between the drill string 108 and the walls of the wellbore 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (e.g., a mud pit), which may function as a vessel or storage system for drilling fluid 122. While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure. Drilling fluid 122 may be pumped out of the wellbore 116, however, as discussed above, should any of drilling fluid 122 become trapped in the annulus and not be pumped out of the wellbore 116, the remaining portion may set into a hardened mass (e.g., after activation from heat generated during drilling or production operations) and not volatize or otherwise generate an expansive gas.

Drilling fluid 122 may be added to a mixing hopper 134, a type of vessel, communicably coupled to or otherwise in fluid communication with the retention pit 132. The mixing hopper 134 may include, but is not limited to, mixers and related mixing equipment known to those skilled in the art. In alternative embodiments, however, drilling fluid 122 may not be added to a mixing hopper. In at least one example, there could be more than one retention pit 132, such as multiple retention pits 132 in series. Moreover, the retention pit 132 may be representative of one or more fluid storage facilities and/or units where the disclosed treatment fluids may be stored, reconditioned, and/or regulated until used as a treatment fluid, for example, as a drilling fluid 122.

As mentioned above, drilling fluid 122 may directly or indirectly affect the components and equipment of drilling assembly 100. For example, drilling fluid 122 may directly or indirectly affect the pump 120 and any pumping systems, which representatively includes any conduits, pipelines, trucks, tubulars, and/or pipes which may be coupled to the pump and/or any pumping systems and may be used to fluidically convey drilling fluid 122 downhole, any pumps, compressors, or motors (e.g., topside or downhole) used to drive drilling fluid 122 into motion, any valves or related joints used to regulate the pressure or flow rate of drilling fluid 122, and any sensors (i.e., pressure, temperature, flow rate, etc.), gauges, and/or combinations thereof, and the like. Drilling fluid 122 may also directly or indirectly affect the mixing hopper 134 and the retention pit 132 and their assorted variations.

Drilling fluid 122 may also directly or indirectly affect the various downhole equipment and tools that may come into contact with drilling fluid 122 such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. In embodiments, drilling fluid 122 may also directly or indirectly affect any downhole heat exchangers, valves and corresponding actuation devices, tool seals, packers and other wellbore isolation devices or components, and the like associated with the wellbore 116. The drilling fluid 122 may also directly or indirectly affect the drill bit 114, which may include, but is not limited to, roller cone bits, PDC bits, natural diamond bits, any hole openers, reamers, coring bits, etc.

While not specifically illustrated herein, drilling fluid 122 may also directly or indirectly affect any transport or delivery equipment used to convey drilling fluid 122 to drilling assembly 100 such as, for example, any transport vessels, conduits, pipelines, trucks, tubulars, and/or pipes used to fluidically move drilling fluid 122 from one location to another, any pumps, compressors, or motors used to drive drilling fluid 122 into motion, any valves or related joints used to regulate the pressure or flow rate of drilling fluid 122, and any sensors (i.e., pressure and temperature), gauges, and/or combinations thereof, and the like.

Drilling fluid 122 may also directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment. The fluid processing unit (s) 128 may further include one or more sensors, gauges, pumps, compressors, and the like used store, monitor, regulate, and/or recondition the treatment fluids.

One of the primary functions of drilling fluid 122 may be to remove drill cuttings from wellbore 116. Fluid processing unit(s) 128 may be implemented in drilling assembly 100 to aid in that process. Fluid processing unit(s) 128 may include a magnetic swarf assembly 136.

Figure 2:
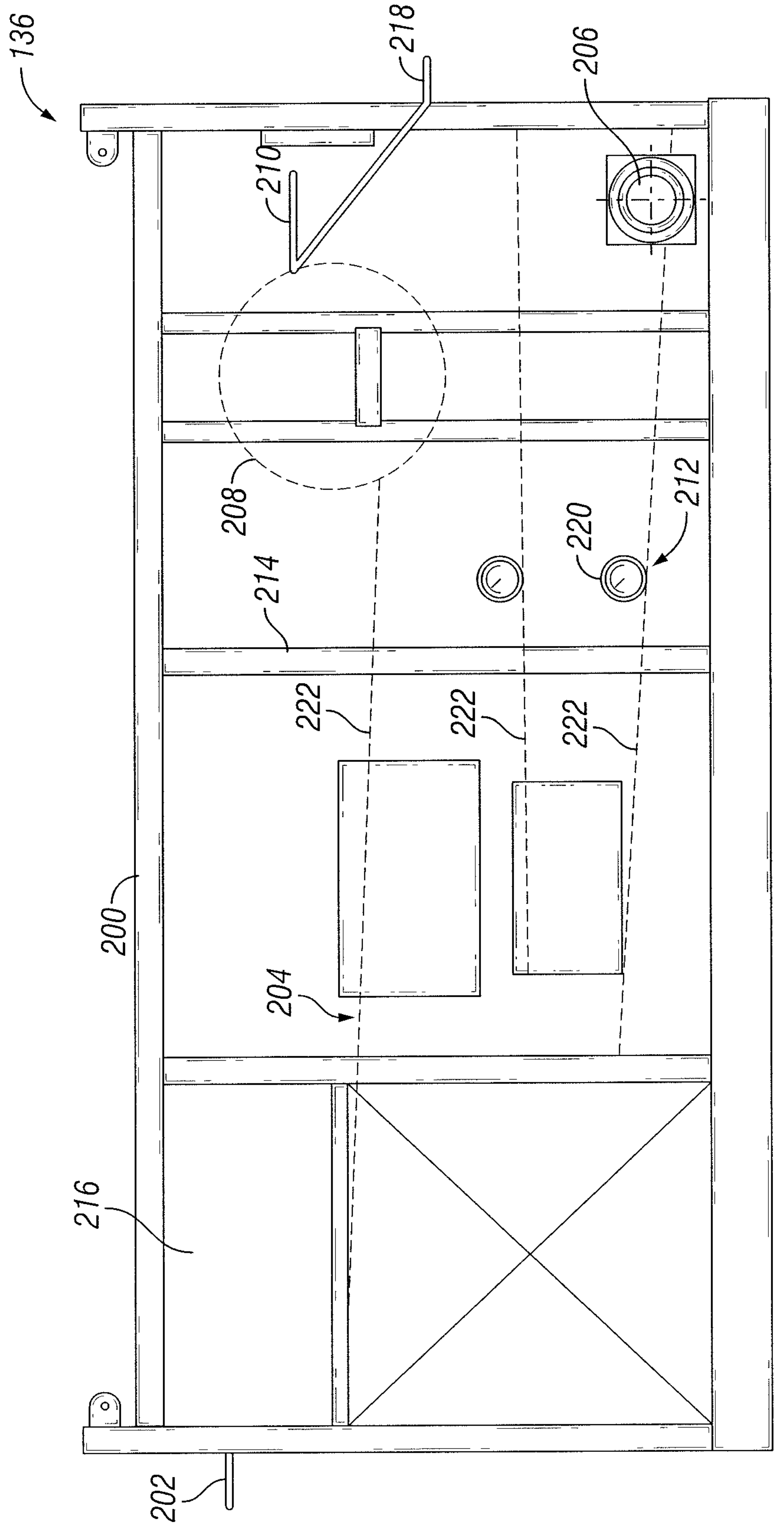
FIG. 2 illustrates a cross-sectional view of a magnetic swarf assembly.

FIG. 2 illustrates an embodiment of magnetic swarf assembly 136. Magnetic swarf assembly 136 may serve to remove magnetic swarf from a fluid. The ferromagnetic swarf may include drilling cuttings, such as casing debris. In additional to magnetic swarf, magnetic swarf assembly 136 may also remove other ferromagnetic materials from drilling fluid 122. Magnetic swarf assembly 136 may be any suitable size, height, or shape. In embodiments, magnetic swarf assembly 136 may be a rectangular box. The width of magnetic swarf assembly 136 may be from about 1 foot (0.3 meters) to about 20 feet (6.1 meters), from about 1 foot (0.3 meters) to about 10 feet (3.1 meters), or from about 10 feet (3.1 meters) to about 20 feet (6.1 meters). The length of magnetic swarf assembly 136 may be from about 1 foot (0.3 meters) to about 30 feet (9.1 feet), from about 1 feet to about 15 feet (4.6 meters), or from about 15 feet (4.6 meters) to about 30 feet (9.1 feet). The height of magnetic swarf assembly 136 may be from about 1 foot (0.3 meters) to about 20 feet (6.1 meters), from about 1 foot (0.3 meters) to about 10 feet (3.1 meters), or from about 10 feet (3.1 meters) to about 20 feet (6.1 meters). Magnetic swarf assembly 136 may be made of any suitable material. Suitable material may include, but is not limited to, a metal, nonmetal, plastic, composite, ceramic, and/or combinations thereof. Magnetic swarf assembly 136 may include a housing 200, an inlet 202, a flow pathway 204, an outlet 206, a magnetic body 208, a scraper 210, and/or an inspection gauge 212.

Housing 200 may serve as a casing to enclose the components of magnetic swarf assembly 136. Housing 200 may be any suitable size, height, or shape. As illustrated, housing 200 may be a hollow, rectangular box. Housing 200 may be made of any suitable material. Without limitation, suitable material may include, but is not limited to, a metal, nonmetal, plastic, composite, ceramic, and/or combinations thereof. Housing 200 may include multiple parts disposed to one another. Each individual part may be temporarily fastened or permanently affixed to one another. For example, the multiple parts may be differently sized pieces of sheet metal. There may be holes disposed on the multiple parts wherein suitable fasteners may affix an individual part to another individual part. Suitable fasteners may include, but are not limited to, nuts and bolts, washers, screws, pins, sockets, rods and studs, hinges and/or any combination thereof. In addition, threading, adhesives, welding and/or any combination thereof may be used.

Housing 200 may include supports 214. Supports 214 may provide structural support to housing 200. Supports 214 may be any suitable size, height, or shape. Supports 214 may be made of any suitable material. Suitable material may include, but is not limited to, a metal, nonmetal, plastic, composite, ceramic, and/or combinations thereof. As illustrated, supports 214 may be disposed vertically between the bottom and top of housing 200. While not illustrated, additional supports may be disposed between the bottom and top of housing 200 at any suitable angle. For example, additional supports may be disposed horizontally between supports 214 that are disposed vertically between the bottom and top of housing 200.

A chamber 216 may be formed within housing 200. Chamber 216 may be an empty space in housing 200. While only a single chamber 216 is shown, there may be a plurality of chambers 216 in magnetic swarf assembly 136. Chamber 216 may be disposed between any supports 214 and/or individual parts (e.g., walls, floor, ceiling) of housing 200.

Inlet 202 may be an opening in housing 200. Inlet 202 may be an absence of material. Inlet 202 may be any suitable size and shape. Inlet 202 may allow fluid to enter into housing 200. In embodiments, inlet 202 may be disposed near the top of housing 200. Inlet 202 may receive piping (not illustrated), wherein the piping transports a fluid from a previous location, through inlet 202, and into housing 200.

The fluid may then traverse along flow pathway 204. Flow pathway 204 may direct fluid through magnetic swarf assembly 136 from inlet 202 to outlet 206, wherein the flow pathway 204 is the area along which a fluid flows. Flow pathway 204 may be an open or closed pathway for the flow of fluid through magnetic swarf assembly 136. Flow pathway 204 may be a combination of open and closed pathways for the flow of fluid. As illustrated, flow pathway 204 may include one or more flow shelves 222. While not illustrated, flow pathway 204 may utilize conveyor belts for conveyance of the fluid on flow pathway 204. Alternatively, flow pathway 204 may use gravity for feeding fluid through flow pathway 204. Flow shelves 222 may support the flow of a fluid within magnetic swarf assembly 136. Flow shelves 222 may be any suitable size, height, or shape. Flow shelves 222 may have an elongated flat surface. Flow shelves 222 may be made of any suitable material. Suitable material may include, but is not limited to, a metal, nonmetal, plastic, composite, ceramic, and/or combinations thereof. As illustrated, there may be a plurality of flow shelves 222 that overlap. Flow shelves 222 may be disposed along the length or along a portion of the length of housing 200. The sides of flow shelves 222 may tangentially abut the walls of housing 200. Flow shelves 222 may be disposed at any suitable angle in relation to a horizontal axis.

Outlet 206 may be an opening in housing 200. Outlet 206 may be an absence of material. Outlet 206 may be any suitable size and shape. Outlet 206 may allow fluid to exit from housing 200. While only a single outlet 206 is illustrated, there may be a plurality of outlets 206. In embodiments, outlet 206 may be disposed near the bottom of housing 200. Outlet 206 may receive piping (not illustrated), wherein the piping transports a fluid from housing 200, through outlet 206, and to a separate location. As the fluid enters inlet 202 and exits outlet 206, the fluid may be processed for the removal of ferromagnetic material.

Magnetic body 208 may be implemented in magnetic swarf assembly 136. Magnetic body 208 may remove ferromagnetic material (e.g., metallic debris) from a fluid travelling through magnetic swarf assembly 136. Magnetic body 208 may be any suitable size, height, or shape. For example, magnetic body 208 may be cylindrical in shape. In some embodiments, magnetic body 208 may be in the shape of a drum and referred to as a "magnetic swarf drum." In embodiments, magnetic body 208 may be made of any suitable material. Suitable material may include, but is not limited to, a metal, nonmetal, plastic, composite, ceramic, and/or combinations thereof. In embodiments, certain components of magnetic body 208 may include ferromagnetic material. Magnetic body 208 may be disposed within housing 200. Magnetic body 208 may be disposed in a manner such that the length of magnetic body 208 is perpendicular to flow pathway 204 directed by flow shelves 222. However, other arrangements of magnetic body 208 may be suitable for particular applications. Magnetic body 208 may rotate along a central axis parallel to the length of magnetic body 208. In embodiments, as the fluid flows down housing 200 along flow shelves 222, magnetic body 208 may be completely or partially within flow pathway 204. In embodiments, the fluid may flow around the bottom-half portion of magnetic body 208. As fluid flows around magnetic body 208, ferromagnetic material (e.g., metallic debris) may separate from the fluid and adhere to magnetic body 208. As magnetic body 208 rotates, metallic debris may rotate to the top-half portion of magnetic body 208.

Scraper 210 may be disposed near the top-half portion of magnetic body 208. Scraper 210 may serve to remove the ferromagnetic materials from magnetic body 208. As magnetic body 208 rotates, an edge of scraper 210 may contact (or be in close proximity to) the outer surface of magnetic body 208. The ferromagnetic materials may be forcibly removed due to the blockage of a continued path of motion by the edge of scraper 210 against magnetic body 208. Scraper 210 may be any suitable size, height, or shape. In embodiments, scraper 210 may be made of any suitable material. Suitable material may include, but is not limited to, a metal, nonmetal, plastic, composite, ceramic, and/or combinations thereof. While only a single scraper 210 is shown, there may be a plurality of scrapers 210 positioned around magnetic body 208. There may be a debris shelf 218 to direct the flow of removed ferromagnetic materials away from magnetic body 208.

As the fluid flows around and past magnetic body 208, the weight percentage of ferromagnetic materials in the fluid may decrease. By way of example, the weight percentage of ferromagnetic materials may decrease by 25%, 50%, 75%, 90%, or more. Inspection gauge 212 may be positioned downstream of magnetic body 208 to allow an operator to verify the decrease in weight percentage of metallic debris present in the fluid. For example, inspection gauge 212 may be positioned in flow pathway 204 between magnetic body 208 and outlet 206. There may be a plurality of inspection gauges 212. Inspection gauges 212 may be disposed anywhere within housing 200 so long as at least a portion of inspection gauges 212 is in contact with flow pathway 204.

Inspection gauge 212 may further include a magnetic plug 220. Magnetic plug 220 may be inserted into and withdrawn from flow pathway 204. As illustrated, magnetic plug 220 may be disposed in flow pathway 204 after magnetic body 208, e.g., in flow pathway 204 between magnetic body 208 and outlet 206. There may be a plurality of magnetic plugs 220. There may be holes disposed on housing 200 enabling magnetic plug 220 access to the flow pathway 204. An operator may visually inspect magnetic plug 220 for ferromagnetic materials. The quantity of ferromagnetic materials on magnetic plug 220 may provide the operator with a visual indication of the efficiency of magnetic swarf assembly 136. The operator may adjust settings to maximize operation efficiency (e.g., adjust flowrate of the fluid). Magnetic plug 220 may also provide additional removal of ferromagnetic materials from the flow pathway 204 by attracting ferromagnetic materials with a magnetic field.

Magnetic swarf assembly 136 may be disposed at any suitable location for removal of ferromagnetic materials from a fluid. For example, magnetic swarf assembly 136 may be located onsite at a drilling operation for removal of ferromagnetic materials (e.g., casing debris) from a drilling fluid. By way of further example, magnetic swarf assembly 136 may be incorporated into drilling assembly 100 (e.g., referring to FIG. 1) to remove metallic debris as a post-operation treatment process or during circulation of drilling fluid 122 (e.g., referring to FIG. 1). Drilling fluid 122 may enter magnetic swarf assembly 136 with a large presence of ferromagnetic materials through inlet 202 and may leave with a smaller presence of ferromagnetic materials through outlet 206.

Figure 3:
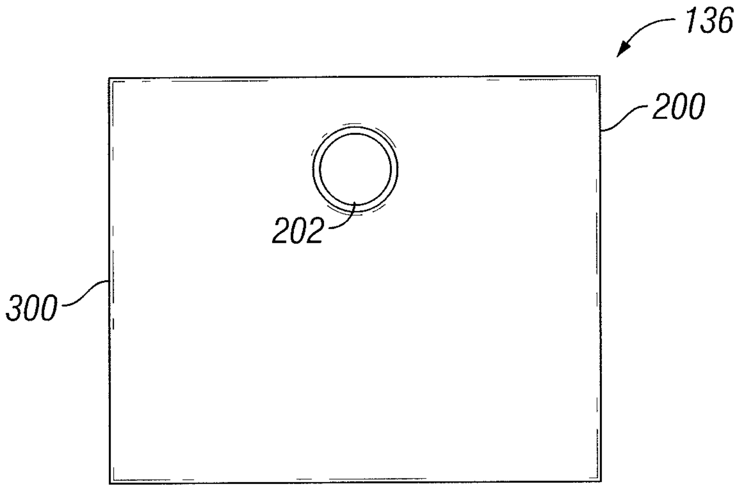
FIG. 3 illustrates a side view of an inlet to a magnetic swarf assembly.
Figure 4:
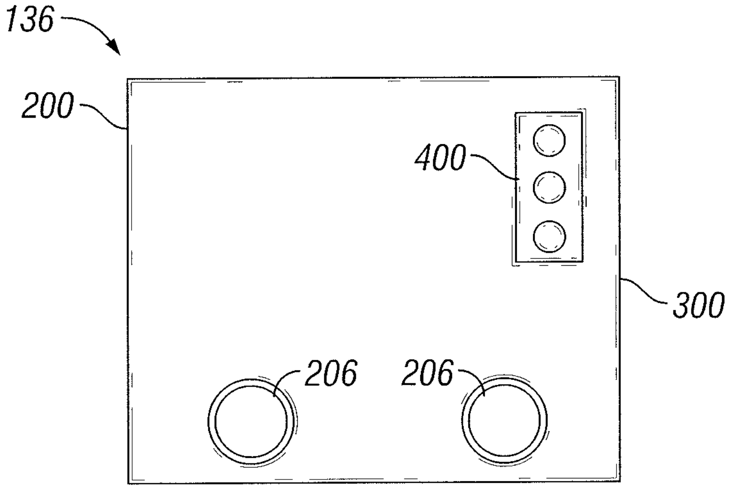
FIG. 4 illustrates a side view of an outlet to a magnetic swarf assembly.

FIG. 3 illustrates inlet 202 to magnetic swarf assembly 136. As illustrated, inlet 202 may be disposed in a wall 300 of housing 200. FIG. 4 illustrates outlet 206 to magnetic swarf assembly 136. As illustrated, a pair of outlets 206 may be disposed in a wall 300 of housing 200. Piping (not illustrated) may separately connect to both inlet 202 and outlet 206 to provide fluid communication between magnetic swarf assembly 136 and drilling assembly 100 (e.g., referring to FIG. 1). Magnetic swarf assembly 136 may employ gravity feed. Alternatively, magnetic swarf assembly 136 may employ pumps and/or conveyor belts to facilitate fluid movement, which may be used in place of or in combination to gravity. As shown on FIG. 4, there may be a control panel 400 disposed on wall 300 of housing 200. Control panel 400 may adjust settings within magnetic swarf assembly 136 and indicate information to an operator. Control panel 400 may be disposed anywhere along wall 300 of housing 200. While control panel 400 is shown disposed on wall 300 with outlet 206, it is not necessary to locate control panel 400 on the same wall 300 as outlet 206. Control panel 400 may include lights, buttons, switches, sensors, displays, and/or combinations thereof. Control panel 400 may provide the means to start and stop operation of magnetic swarf assembly 136. Operation of magnetic swarf assembly 136 may include providing power to magnetic body 208 (e.g., referring to FIG. 2), controlling the revolutions per minute at which magnetic body 208 rotates, enabling fluid flow, adjusting fluid flow, stopping fluid flow, and/or combinations thereof. Control panel 400 may indicate flow rates, fluid volume, temperature, pressure, and/or combinations thereof. Control panel 400 may also provide the means for an emergency stop of all operation.

Figure 5:
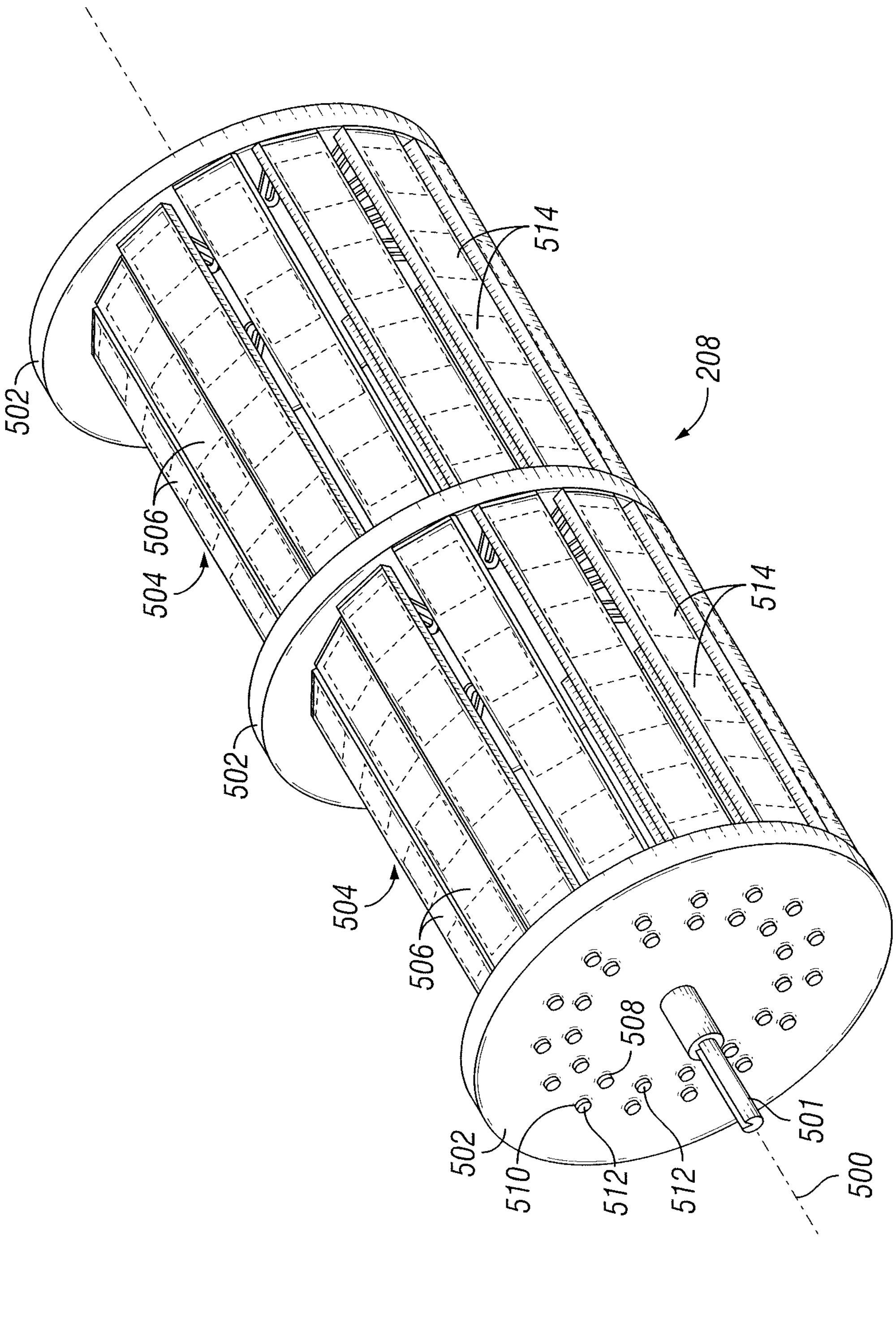
FIG. 5 illustrates an embodiment of a magnetic body.

FIG. 5 illustrates an embodiment of magnetic body 208. Magnetic body 208 may be powered by and/or controlled by control panel 400 (e.g., referring to FIG. 4). Magnetic body 208 may include a longitudinal axis 500. Magnetic body 208 may rotate about longitudinal axis 500. Accordingly, magnetic body 208 may be considered a magnetic roller. As illustrated, an axle 501 may be disposed along longitudinal axis 500 of magnetic body 208. Axle 501 may serve as a central shaft for rotating magnetic body 208. As illustrated, the length of axle 501 may be longer than the length of magnetic body 208. Magnetic body 208 may include end plates 502 and one or more magnetic units 504.

End plates 502 may secure axle 501 to magnetic body 208. End plates 502 may also support and position the magnetic units 504 in the magnetic body 208. End plates 502 may be any suitable size, height, or shape. For example, end plates 502 may be circular. In addition, end plates 502 may be made of any suitable material. Suitable material may include, but is not limited to, a metal, nonmetal, plastic, composite, ceramic, and/or combinations thereof. There may be a plurality of end plates 502, as shown in FIG. 5. As illustrated, there may be holes 508, 510 disposed on end plates 502. There may be a first set of holes 508 and a second set of holes 510. First set of holes 508 may be disposed at a distance from and around the longitudinal axis 500 of magnetic body 208. First set of holes 508 may be disposed in the same and/or different shape as that of end plates 502. First set of holes 508 may be disposed in a circular fashion. Second set of holes 510 may be disposed in the same manner as first set of holes but at a larger distance from the longitudinal axis 500 of magnetic body 208. Both first set of holes 508 and second set of holes 510 may provide attachment points for suitable fasteners 512 to be applied. Suitable fasteners 512 may include, but are not limited to, nuts and bolts, washers, screws, pins, sockets, rods and studs, hinges and/or any combination thereof. For example, fasteners 512 may include lug guide bolts disposed in both first set of holes 508 and second set of holes 510, wherein the bolt-face of the lug guide bolts may be disposed on the inner surface of each of end plates 502. Fasteners 512 may secure magnetic units 504 to end plates 502.

Magnetic units 504 may each include spars 506. Magnetic units 504 may serve to produce the magnetic field that extends from magnetic body 208. Magnetic units 504 may allow the removal of metallic debris from a fluid by attracting that metallic debris towards magnetic body 208 through the magnetic field. Spars 506 may be the connecting unit between end plates 502. As illustrated, magnetic units 504 may each include spars 506 that extend between spaced pairs of end plates 502. Spars 506 may be any suitable size, height, or shape. For example, spars 506 may include beams that have a rectangular cross section, t-shaped cross section, i-shaped cross section, triangular cross section, circular cross section, or channel cross section. Spars 506 may be made of any suitable material. Suitable materials may include, but is not limited to, a metal, nonmetal, plastic, composite, ceramic, and/or combinations thereof. There may be a plurality of spars 506. In embodiments, the plurality of spars 506 for each of magnetic units 504 may be disposed between end plates 502 and around the central axis of magnetic body 208.

Magnetic units 504 may further include magnets 514. Magnets 514 may serve to produce the magnetic field that extends from magnetic body 208. Magnets 514 may be any suitable size, height, or shape. Magnets 514 may be made of any suitable material, including, but not limited to, permanent magnetic. Suitable materials may include, but are not limited to, ferromagnetic materials, such as iron, cobalt, nickel, and alloys of rare-earth metals. Alternatively, magnets 514 may be in the form of an electromagnet. There may be a plurality of magnets 514 disposed in the magnetic units 504. Magnets 514 may be disposed around longitudinal axis 500 of magnetic body 208. As illustrated, magnets 514 may be coupled to spars 506. Any suitable technique may be used to affix magnets 514 to spars, including, but not limited to, fasteners, such as nuts and bolts, washers, screws, pins, sockets, rods and studs, hinges and/or any combination thereof. In addition, threading, adhesives, welding and/or any combination thereof may be used.

Figure 6:
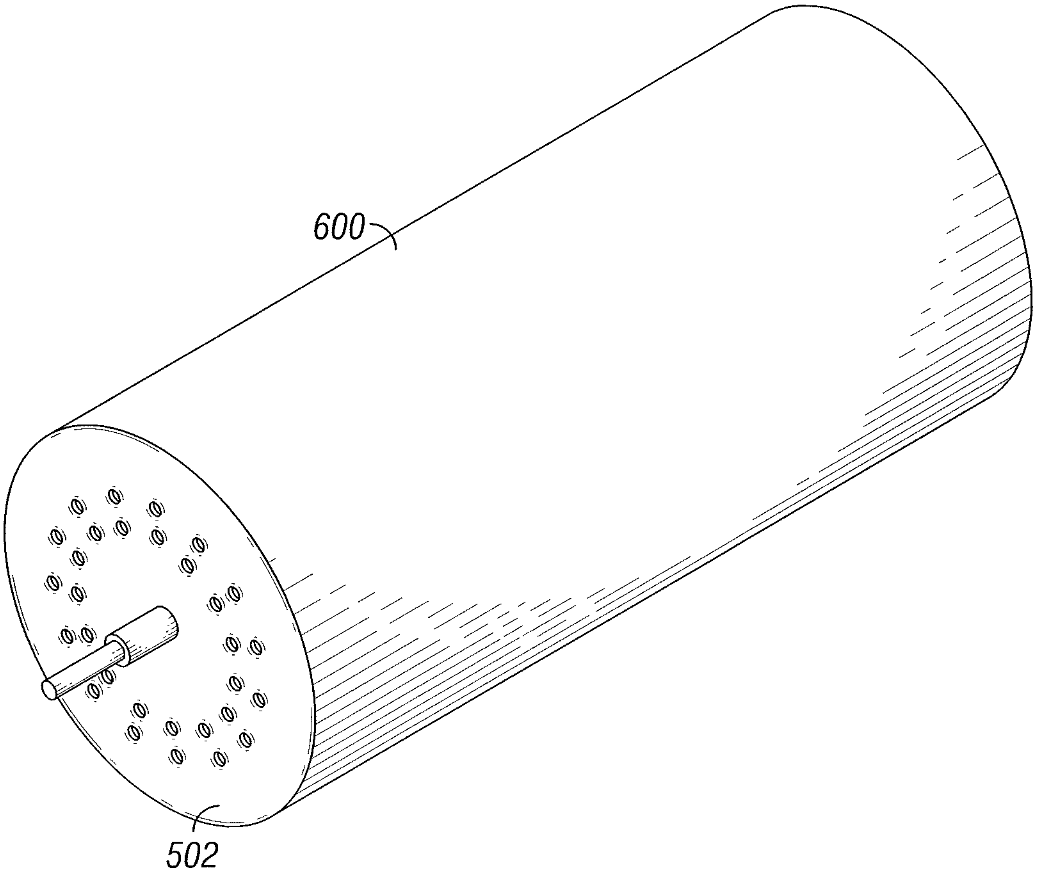
FIG. 6 illustrates an embodiment of a sleeve.

Referring now to FIG. 6, magnetic body 208 may further include a sleeve 600. As illustrated, sleeve 600 may be disposed around magnetic units 504 (e.g., referring to FIG. 5). Sleeve 600 may be any suitable size, height, or shape. For example, sleeve 600 may be of a hollow, cylindrical shape. As illustrated, the ends of sleeve 600 align with the ends of end plates 502. Sleeve 600 may be made of any suitable material. Suitable materials may include, but are not limited to, a metal, nonmetal, plastic, composite, ceramic, and/or combinations thereof. Sleeve 600 may have a smooth, outer surface. For example, sleeve 600 may be made from a ferromagnetic material, such as iron, cobalt, nickel, and alloys of rare-earth metals. Sleeve 600 may be temporarily or permanently fixed to end plates 502. Suitable fasteners, threading, adhesives, welding and/or any combination thereof may be used to secure sleeve 600 to end plates 502. Suitable fasteners may include, but are not limited to, nuts and bolts, washers, screws, pins, sockets, rods and studs, hinges and/or any combination thereof. In addition, threading, adhesives, welding and/or any combination thereof may be used.

Figure 7:
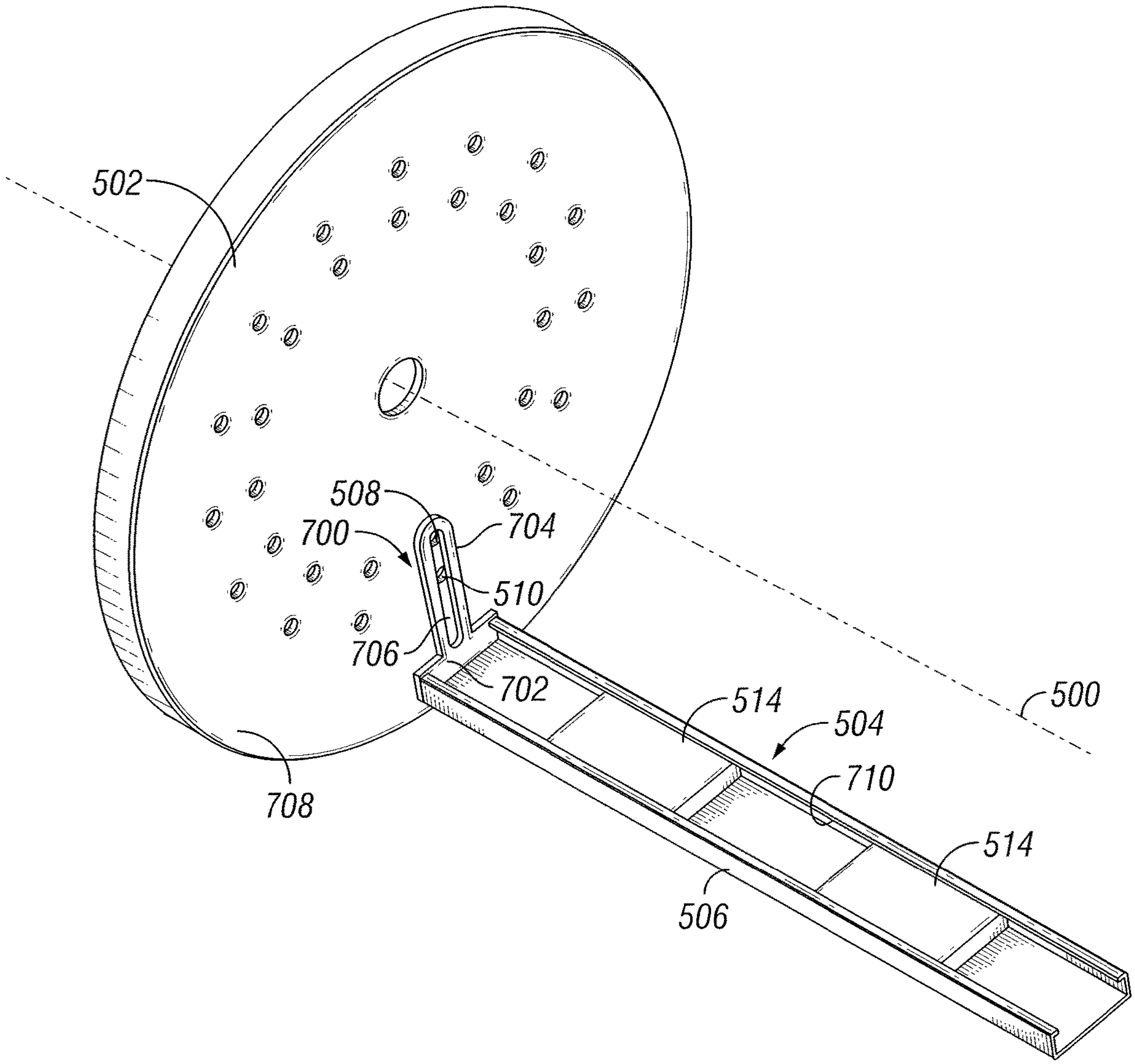
FIG. 7 illustrates an embodiment of an end plate and a spar.

FIG. 7 illustrates an embodiment of end plate 502 and magnetic unit 504. For ease of illustration, only a single end plate 502 and spar 506 is shown. As illustrated, magnetic unit 504 may further include a magnet slide lug 700. While not shown, there may be a magnet slide lug 700 disposed at each end of spar 506. Magnet slide lug 700 may serve as the connecting piece between spar 506 and each end plate 502. Magnet slide lug 700 may be any suitable size, height, or shape. In addition, magnet slide lug 700 may be made of any suitable material. Suitable materials may include, but are not limited to, a metal, nonmetal, plastic, composite, ceramic, and/or combinations thereof.

As illustrated, magnet slide lug 700 may include a base section 702 and an elongated loop section 704. Base section 702 may be any suitable size, height, or shape. As illustrated, base section 702 may be rectangular in cross section. Base section 702 may serve to connect spar 506 to magnet slide lug 700. Spar 506 may be temporarily or permanently fixed to magnet slide lug 700. Suitable fasteners, threading, adhesives, welding and/or any combination thereof may be used. Suitable fasteners may include, but are not limited to, nuts and bolts, washers, screws, pins, sockets, rods and studs, hinges and/or any combination thereof.

Elongated loop section 704 may be any suitable size, height, or shape. In embodiments, elongated loop section 704 may be elliptical in shape. There may be a hole 706 disposed in elongated loop section 704. In embodiments, hole 706 may be elongated with a length greater than its width. The faces of the fasteners 512 (e.g., referring to FIG. 5) that fasten spar 506 to end plates 502 may engage elongated loop section 704. In addition, elongated loop section 704 may be positioned so that one of the first set of holes 508 and one of the second set of holes 510 are positioned in hole 706. As illustrated, hole 706 may have a length that is greater than the spacing between the first set of holes 508 and the second set of holes 510.

With additional reference to FIGS. 5 and 6, the attachment of elongated loop section 704 and fasteners 512 should enable limited radial displacement of magnetic units 504. The magnetic units 504 may be displaceable towards, and away from, sleeve 600, but be prevented from longitudinal displacement. As illustrated on FIG. 7, end plate 502 may include a lip 708 that limits radial displacement of magnetic unit 504 towards sleeve 600. In a first position, spars 506 may be aligned tangentially with an edge of end plates 502. Lip 708 may prevent spars 506 from moving radially outward beyond first position. In a second position, spars 506 may slide radially inwardly for a certain distance towards the longitudinal axis 500 of magnetic body 208. This distance is equivalent to the distance between first set of holes 508 and second set of holes 510. The fastener 512 disposed in the second set of holes 510 may limit movement of spars 506 radially inward beyond second position. As illustrated, spars 506 may include a channel 710 in which magnets 514 may be disposed. As spars 506 move from first position to second position, the magnets 514 should likewise move radially inward further away from sleeve 600.

Figure 8:
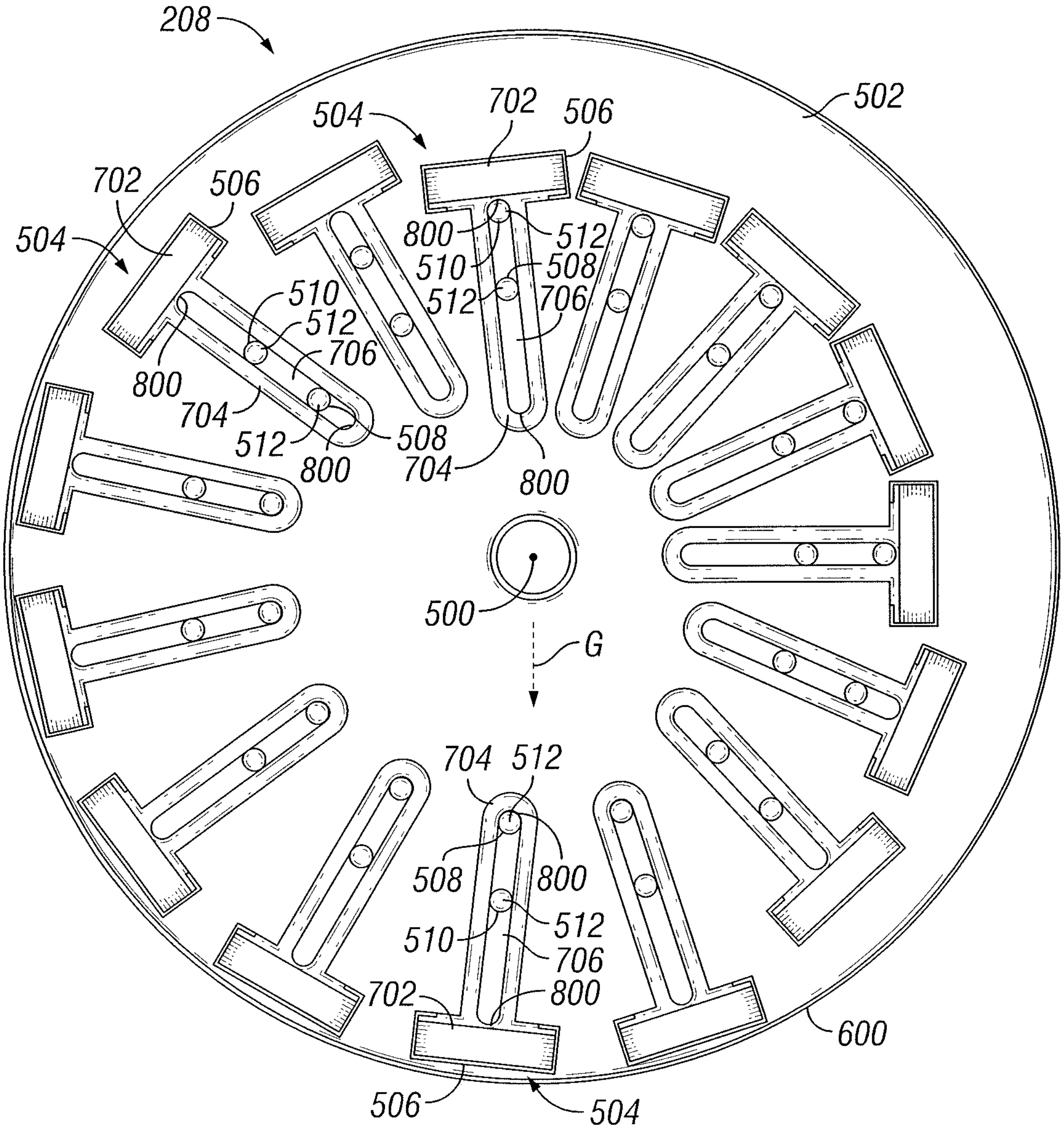
FIG. 8 illustrates the different positions of a plurality of spars.

FIG. 8 illustrates the different positions of a plurality of spars 506. As illustrated, spars 506 are disposed around longitudinal axis 500 of magnetic body 208. Elongated loop section 704 restricts the path of movement of magnetic units 504 along a single axis, i.e., the radial axis, such that magnetic units 504 may move radially outward but not longitudinally. As magnetic body 208 rotates about its longitudinal axis 500, the position of elongated loop sections 704 may change as gravity G pulls spars 506 and corresponding magnetic units 504 downward. Spars 506 near the bottom edge of end plate 502, in relation to the ground, may be in a first position. As illustrated, in the first position, fastener 512 disposed in first set of holes 508 may abut the rounded edge 800 of the hole 706 of elongated loop section 704 that is closest to the longitudinal axis 500. As magnetic body 208 rotates, magnetic units 504 may move from first position to the second position with the magnetic units 504 sliding radially inward towards the longitudinal axis 500. As spars 506 reach the second position at the top of end plate 502, spars 506 may have slid radially inward by force of gravity G so that the fastener 512 disposed in second set of holes 510 may abut the rounded edge 800 of the hole 706 of elongated loop section 704 that is closest to base section 702. As end plate 502 continues to rotate, magnetic units 504 will move from the second position to the first position, with gravity G pulling spar 506 downward, away from the longitudinal axis 500 of end plate 502. Spars 506 may slide radially outward towards the edge of end plate 502 until the fasteners 512 disposed in first set of holes 508 abuts the rounded edge 800 of the hole 706 of elongated loop section 704 that is closest to the longitudinal axis 500 of end plate 502. As illustrated, in the first position at the bottom of end plates 502, the magnetic units 504 may be disposed closer to sleeve 600 than the magnetic units 504 disposed at the top of end plates 502. Accordingly, magnetic units 504 disposed at first position may exert a greater magnetic field outside magnetic body 208 than magnetic units 504 at second position.

With reference now to FIGS. 1, 5, and 8, an example technique for operation of magnetic swarf assembly 136 will now be described. An operator may provide power to magnetic swarf assembly 136 and initiate fluid to enter through inlet 202. The fluid may be a drilling fluid that containers ferromagnetic materials, such as casing debris. As fluid flows, magnetic body 208 may rotate. As fluid flows past and/or around the rotating magnetic body 208, the fluid may engage magnetic body 208. At least a portion of the ferromagnetic materials may be removed from the fluid and cling to magnetic body 208 through the use of magnetic units 504. As previously described, magnetic units 504 may generate a magnetic field that attracts ferromagnetic material to magnetic body 208. The ferromagnetic materials may adhere to the sleeve 600. The magnetic field around magnetic body 208 may fluctuate due to the shifting positions of spars 506 disposed on end plates 502 (as previously discussed). The magnetic field may be weaker about a top-half portion of magnetic body 208. Scraper 210 may engage the top-half portion and may physically remove ferromagnetic materials from magnetic body 208. The removed ferromagnetic materials may traverse along debris shelf 218 to exit magnetic swarf assembly 136. After the fluid passes magnetic body 208, the fluid may exit magnetic swarf assembly 136 through outlet 206. The operator may adjust settings within magnetic swarf assembly 136 by utilizing inspection gauge 212 to check the weight percentage of ferromagnetic materials within the fluid.

The systems and methods for cleaning a drilling fluid may include any of the various features of the systems and methods disclosed herein, including one or more of the following statements.

Statement 1. An apparatus may include a magnetic body having a longitudinal axis, wherein the magnetic body includes a pair of end plates that are spaced along the longitudinal axis and a magnetic unit disposed between the pair of end plates, wherein the magnetic unit is operable to generate a magnetic field, and an axle disposed along a longitudinal axis of the magnetic body, wherein the axle is operable to rotate the magnetic body about the longitudinal axis.

Statement 2. The apparatus of statement 1, wherein the magnetic unit includes spars that extend between the pair of end plates, wherein the spars are disposed around the longitudinal axis, and wherein the magnetic unit includes magnets coupled to the spars.

Statement 3. The apparatus of statement 1 or 2, wherein the magnetic body further includes a sleeve disposed around the magnetic unit.

Statement 4. The apparatus of any of the preceding statements, wherein the magnets include permanent magnets.

Statement 5. The apparatus of any of the preceding statements, wherein the pair of end plates each include a first set of holes and a second set of holes, wherein the first set of holes is disposed closer to the longitudinal axis than the second set of holes.

Statement 6. The apparatus of statement 5, wherein fasteners extend through the first set of holes and the second set of holes to secure the magnetic unit to the end plates such that the magnetic unit can move radially while being fixed longitudinally between the pair of end plates.

Statement 7. The apparatus of any of the preceding statements, wherein the pair of end plates each include a first set of holes and a second set of holes, wherein the first set of holes is disposed closer to the longitudinal axis than the second set of holes; wherein the magnetic unit includes spars disposed around the longitudinal axis that extend between the pair of end plates; wherein the magnetic body further includes a sleeve disposed around the magnetic unit; wherein the magnetic unit includes permanent magnets coupled to the spars; wherein fasteners extend through the first set of holes and the second set of holes to secure the magnetic unit to the end plates such that the magnetic unit can move radially while being fixed longitudinally between the pair of end plates; wherein the magnetic unit includes magnetic slide lugs that secure the spars to the pair of endplates, wherein the magnetic slide lugs each a base section and an elongated loop section, wherein the elongated loop section includes a hole positioned so that one of the first set of holes and one of the second set of holes are positioned in the hole.

Statement 8. A magnetic swarf assembly may include a housing including an inlet and an outlet; a flow pathway between the inlet and the outlet; and a magnetic body disposed in the flow pathway and having a longitudinal axis, wherein the magnetic body includes a magnetic unit operable to generate a magnetic field.

Statement 9. The magnetic swarf assembly of statement 8, wherein the flow pathway includes a flow shelf with an elongated flat surface.

Statement 10. The magnetic swarf assembly of statements 8 or 9, wherein the magnetic body includes a pair of end plates that are spaced along the longitudinal axis, wherein the magnetic unit is disposed between the pair of end plates.

Statement 11. The magnetic swarf assembly of statement 10, wherein the magnetic unit includes spars that extend between the pair of end plates, wherein the spars are disposed around the longitudinal axis, wherein the magnetic unit includes magnets coupled to the spars, and wherein the magnetic body further includes a sleeve disposed around the magnetic unit.

Statement 12. The magnetic swarf assembly of statement 11, wherein the magnets include permanent magnets.

Statement 13. The magnetic swarf assembly of statement 10, wherein fasteners extend through the end plates to secure the magnetic unit to the endplates, such that the magnetic body can move radially while being fixed longitudinally between the pair of end plates.

Statement 14. The magnetic swarf assembly of any of statements 8 to 13, further including a scraper positioned to engage the magnetic body to remove ferromagnetic materials from the magnetic body.

Statement 15. The magnetic swarf assembly of any of statements 8 to 14, further including an inspection gauge disposed in the flow pathway operable to monitor concentration of ferromagnetic materials in a fluid flowing in the flow pathway.

Statement 16. A system may include a drilling fluid; a pump operable to circulate the drilling fluid in a wellbore; a drill string disposed in the wellbore; and a magnetic swarf assembly operable to receive at least a portion of the drilling fluid, wherein the magnetic swarf assembly may include a housing including an inlet and an outlet; a flow pathway between the inlet and the outlet; and a magnetic body disposed in the flow pathway and having a longitudinal axis, wherein the magnetic body includes a magnetic unit operable to generate a magnetic field.

Statement 17. The system of statement 16, wherein the magnetic body includes a pair of end plates that are spaced along the longitudinal axis, wherein the magnetic unit is disposed between the pair of end plates.

Statement 18. The system of statement 17, wherein the magnetic unit includes spars that extend between the pair of end plates, wherein the spars are disposed around the longitudinal axis, wherein the magnetic unit includes magnets coupled to the spars, and wherein the magnetic body further includes a sleeve disposed around the magnetic unit.

Statement 19. The system of any of statements 16 to 18, further including a retention pit for the drilling fluid, wherein the magnetic swarf assembly is positioned to receive the drilling fluid from the wellbore before the drilling fluid is placed in the retention pit.

Statement 20. A method for cleaning a drilling fluid may include of rotating a magnetic body; and flowing the drilling fluid past the magnetic body, wherein the drilling fluid includes ferromagnetic materials, and wherein the magnetic body removes at least a portion of ferromagnetic materials from the drilling fluid.

Statement 21. The method of statement 20, wherein the magnetic body further includes permanent magnets disposed around a longitudinal axis of the magnetic body, and the rotating the magnetic body further includes moving the permanent magnets radially inward and radially outward in relation to the longitudinal axis, and wherein the permanent magnets adjusts a magnetic field applied to the drilling fluid by the magnetic body.

Statement 22. The method of statements 20 or 21, further including drilling through one or more metallic casings in a wellbore, wherein the drilling fluid carries casing debris from the wellbore.

Statement 23. The method of any of statements 20 to 22, further including scraping the magnetic body to at least partially remove the portion of the ferromagnetic materials disposed on the magnetic body that were removed from the drilling fluid.

Statement 24. The method of any of statements 20 to 23, wherein the magnetic body is disposed in a housing, and wherein the drilling fluid is gravity fed through the housing past the magnetic body.

Statement 25. The method of statement 24, wherein a flow shelf directs flow of the drilling fluid through the housing.

Although the present invention and its advantages have been described in detail, it should be understood that various changes, substitutions and alterations may be made herein without departing from the spirit and scope of the invention as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "including," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. An apparatus, comprising:

a magnetic body having a longitudinal axis, wherein the magnetic body comprises a pair of end plates that are spaced along the longitudinal axis and a magnetic unit disposed between the pair of end plates, wherein the magnetic unit is operable to generate a magnetic field;

a sleeve extending between the end plates, the sleeve disposed along a circumference of each end plate; and an axle disposed along a longitudinal axis of the magnetic body, wherein the axle is operable to rotate the magnetic body about the longitudinal axis.

2. The apparatus of claim 1, wherein the magnetic unit comprises spars that extend between the pair of end plates, wherein the spars are disposed around the longitudinal axis, and wherein the magnetic unit comprises magnets coupled to the spars.

3. The apparatus of claim 1, wherein the sleeve is disposed around the magnetic unit.

4. The apparatus of claim 2, wherein the magnets comprise permanent magnets.

5. The apparatus of claim 1, wherein the pair of end plates each comprise a first set of holes and a second set of holes, wherein the first set of holes is disposed closer to the longitudinal axis than the second set of holes.

6. The apparatus of claim 5, wherein fasteners extend through the first set of holes and the second set of holes to secure the magnetic unit to the end plates such that the magnetic unit can move radially while being fixed longitudinally between the pair of end plates.

7. The apparatus of claim 1:

wherein the end plates each comprise a first set of holes and a second set of holes, wherein the first set of holes is disposed closer to the longitudinal axis than the second set of holes;

wherein the magnetic unit comprises spars disposed around the longitudinal axis that extend between the pair of end plates;

wherein the magnetic body further comprises a sleeve disposed around the magnetic unit;

wherein the magnetic unit comprises permanent magnets coupled to the spars;

wherein fasteners extend through the first set of holes and the second set of holes to secure the magnetic unit to the end plates such that the magnetic unit can move radially while being fixed longitudinally between the pair of end plates;

wherein the magnetic unit comprises magnetic slide lugs that secure the spars to the pair of endplates, wherein each of the magnetic slide lugs comprise a base section and an elongated loop section.

8. The apparatus of claim 1, further comprising a scraper positioned to engage the magnetic body to remove ferromagnetic materials from the magnetic body.

9. The apparatus of claim 1, further comprising an inspection gauge operable to monitor a concentration of a ferromagnetic material in a fluid.

10. A system, comprising:

a drilling fluid;

a pump operable to circulate the drilling fluid in a wellbore;

a drill string disposed in the wellbore; and a magnetic swarf assembly operable to receive at least a portion of the drilling fluid, wherein the magnetic swarf assembly comprises:

a housing comprising an inlet and an outlet;

a flow pathway between the inlet and the outlet;

a magnetic body disposed in the flow pathway and having a longitudinal axis, wherein the magnetic body comprises a magnetic unit operable to generate a magnetic field, wherein the magnetic body comprises a pair of end plates that are spaced along the longitudinal axis, wherein the magnetic unit is disposed between the pair of end plates; and a sleeve extending between the end plates the sleeve disposed along a circumference of each end plate.

11. The system of claim 10, wherein the sleeve encompasses the end plates.

12. The system of claim 10, wherein the magnetic unit comprises spars that extend between the pair of end plates, wherein the spars are disposed around the longitudinal axis, wherein the magnetic unit comprises magnets coupled to the spars, and wherein the sleeve is disposed around the magnetic unit.

13. The system of claim 10, further comprising a retention pit for the drilling fluid, wherein the magnetic swarf assembly is positioned to receive the drilling fluid from the wellbore before the drilling fluid is placed in the retention pit.

14. A method for cleaning a drilling fluid, comprising:

rotating a magnetic body of an apparatus, the magnetic body comprising a longitudinal axis, a pair of end plates that are spaced along the longitudinal axis, and a magnetic unit disposed between the pair of end plates, wherein the magnetic unit is operable to generate a magnetic field, the apparatus further comprising a sleeve extending between the endplates, the sleeve disposed along a circumference of each end plate and an axle disposed along a longitudinal axis of the magnetic body, wherein the axle is operable to rotate the magnetic body about the longitudinal axis; and flowing the drilling fluid past the magnetic body, wherein the drilling fluid comprises ferromagnetic materials, and wherein the magnetic body removes at least a portion of ferromagnetic materials from the drilling fluid.

15. The method of claim 14, wherein the magnetic body further comprises permanent magnets disposed around a longitudinal axis of the magnetic body, and the rotating the magnetic body further comprises moving the permanent magnets radially inward and radially outward in relation to the longitudinal axis, and wherein the permanent magnets adjusts a magnetic field applied to the drilling fluid by the magnetic body.

16. The method of claim 14, further comprising drilling through one or more metallic casings in a wellbore, wherein the drilling fluid carries casing debris from the wellbore.

17. The method of claim 14, further comprising scraping the magnetic body to at least partially remove the portion of the ferromagnetic materials disposed on the magnetic body that were removed from the drilling fluid.

18. The method of claim 14, wherein the magnetic body is disposed in a housing, and wherein the drilling fluid is gravity fed through the housing past the magnetic body.

19. The method of claim 18, wherein a flow shelf directs flow of the drilling fluid through the housing.

* * * * *